United States Patent [19]

Roeser

[11] 3,967,726

[45] July 6, 1976

[54] PACKAGE FOR THERMOMETER AND SHEATHS

[75] Inventor: Stephen Roeser, Dumont, N.J.

[73] Assignee: Johnson & Johnson, New Brunswick, N.J.

[22] Filed: June 9, 1975

[21] Appl. No.: 585,003

[52] U.S. Cl. ............................ 206/306; 206/45.14; 206/459; 206/491; 206/472
[51] Int. Cl.² ...................... B65D 5/50; B65D 85/38
[58] Field of Search ............... 206/45.14, 305–306, 206/329, 362.4, 364–365, 370, 382, 443, 459, 472, 474, 476, 486, 491; 229/16 D

[56] References Cited
UNITED STATES PATENTS

| | | | |
|---|---|---|---|
| 1,333,601 | 3/1920 | Black | 206/306 X |
| 2,111,265 | 3/1938 | Heckel | 206/382 |
| 2,962,161 | 11/1960 | Lacy | 206/329 |
| 3,372,798 | 3/1968 | Thomas | 206/459 X |
| 3,411,620 | 11/1968 | Steinbock | 206/364 |
| 3,677,866 | 7/1972 | Pickett et al. | 206/306 |
| 3,770,120 | 11/1973 | Hanson | 206/45.14 X |

*Primary Examiner*—Steven E. Lipman
*Attorney, Agent, or Firm*—J. Lipow

[57] ABSTRACT

A package is provided for containing a clinical thermometer together with a plurality of disposable thermometer sheaths while insuring that these components will be free from dirt and breakage. The package comprises an envelope having both a closed and an open transverse end and being folded about the fold line essentially equidistant between the transverse ends. A pocket is provided in the wall of a first section within the folded envelope and a plurality of thermometer sheaths may be affixed to a second inside wall.

12 Claims, 5 Drawing Figures

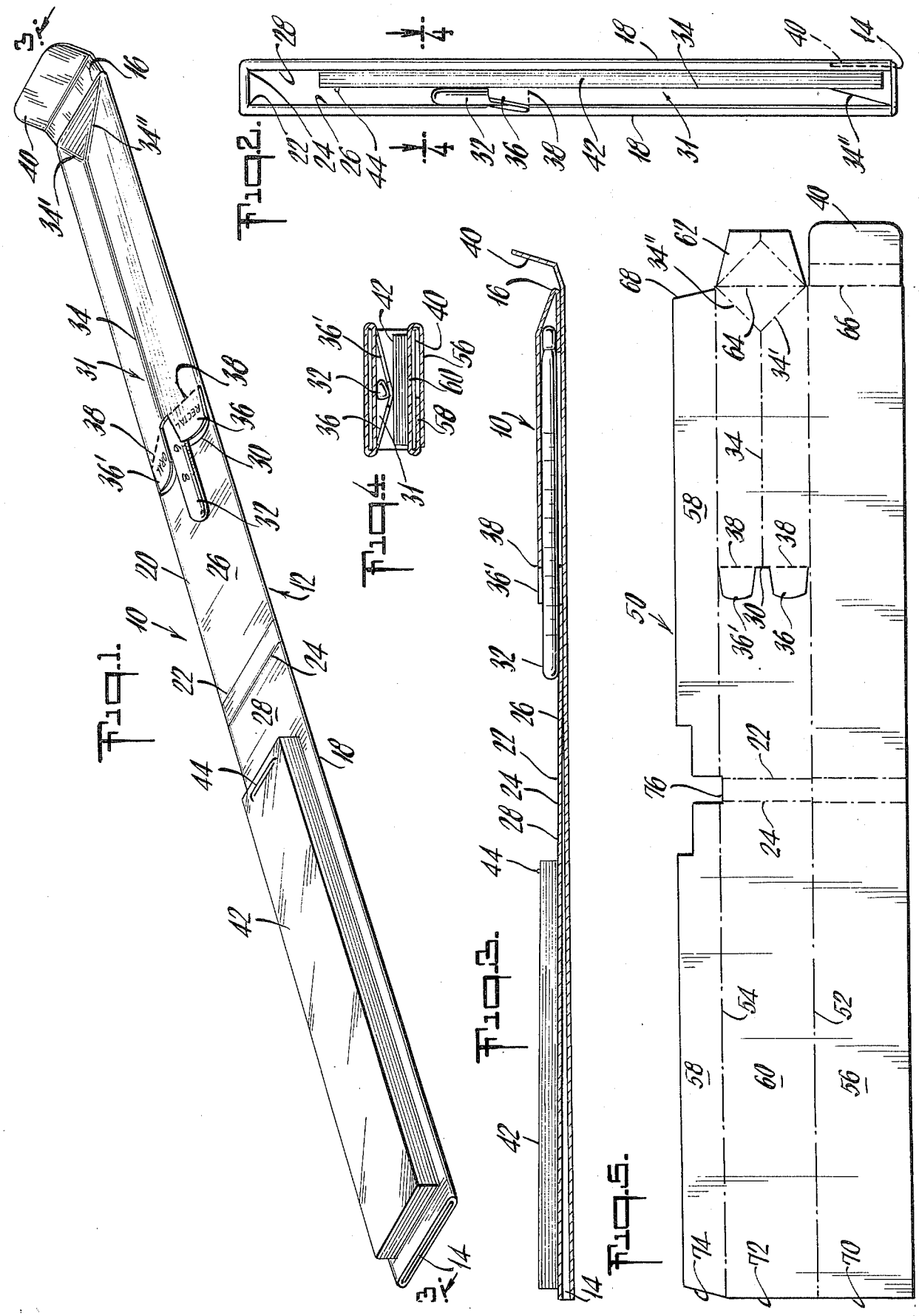

PACKAGE FOR THERMOMETER AND SHEATHS

BACKGROUND OF THE INVENTION

This invention relates to a system for packaging clinical thermometers together with a plurality of protective disposable sheaths to be used in cooperation with the thermometers. More specifically, the packaging system of this invention will provide a thermometer and a supply of sheaths in a package which will insure the cleanliness of these components and which package is capable of being manufactured on high speed equipment and therefor can be produced cheaply enough to allow for disposal after use.

In U.S. Pat. Nos. 3,552,558, issued on Jan. 5, 1971; 3,372,975, issued on May 15, 1973; 3,809,230, issued on May 7, 1974; and 3,847,280, issued on Nov. 12, 1974, all to G. W. Poncy, there is described methods and products for providing, in covered form flat, sheet-like, disposable sheaths for clinical thermometers. These sheaths are designed to be employed at the time that temperature readings are taken. The thermometer is inserted into the covered sheath and the cover stripped away to expose a transparent clean sheath, whereupon the sheathed thermometer may be inserted into a body cavity and a reading taken through the sheath which may then be discarded. The use of these sheaths therefore obviates the need for sterilizing the thermometer itself prior to each temperature taking and each patient in a hospital or at home may be provided with a supply of sheaths and a thermometer which should be conveniently packaged together and placed at his bedside.

The packaging of the supply of sheaths and the thermometer must meet certain criteria. Firstly, since the essence of the system is predicated on the cleanliness of the sheaths, a closeable packaging system is required although it should be noted that the sheaths are individually sealed in covers and, hence, the packaging system need not be absolutely closed. Secondly, means should be provided for containing the thermometer in a manner such that the thermometer is protected from both dirt and breakage. Thirdly, because the entire system, with the exception of the thermometer, is disposable, the packaging should not add greatly to the cost of manufacture and, hence, should be of a design compatible with high speed manufacturing techniques. Heretofore, no suitable packaging system meeting the above criteria has been available.

SUMMARY OF THE INVENTION

In accordance with this instant invention, a packaging system is provided which meets all of the above criteria. Specifically, a package for containing a thermometer and a plurality of disposable sheaths is provided which comprises a longitudinally extending envelope of packaging material. The envelope has both a closed and an open transverse end and first and second major surfaces and is provided with an essentially transverse fold line located essentially equidistant from the transverse ends. The envelope may be folded about this line with the first major surface forming the exterior of the folded envelope and the second major surface forming the interior of the folded envelope. The second major surface is provided with a die cut, cut transversely through that half of this surface nearest the closed end of the envelope to form a pocket in the interior of the folded envelope for containing a thermometer, the pocket having a closed bottom formed from the closed transverse end of the envelope and an open mouth for receiving the thermometer formed by the cut score. A plurality of thermometer sheaths may be affixed to the second half of the second major surface and hence, contained within the interior of the folded envelope. In a preferred embodiment, a closing flap is provided extending from the closed end of the envelope and adapted to engage the open end when the envelope is folded to maintain the envelope in a closed condition.

In still another embodiment, the die cut defining the mouth of the pocket for containing the thermometer is cut to not only form a transverse mouth, but to also provide two tabs which may exhibit appropriate indicia for indicating either rectal or oral thermometer use. In use, the inappropriate tab may be torn off, perforations being provided for facilitating this, so that confusion as to the prior mode of temperature taking is obviated. To facilitate insertion and removal of the thermometer from the pocket, the portion of the second major surface of the envelope forming the pocket may be provided with fold lines which cause this portion to stand away from the remaining walls of the envelope and give the pocket a three-dimensional characteristic.

In still another aspect of this invention, the package is assembled from a one piece blank, the blank comprising a generally elongated rectangular planar sheet provided with two longitudinally extending fold lines which divide the sheet into first and second side sections and a central section. At least one transverse fold line and preferably two spaced apart transverse fold lines are located centrally and transverse to the three sections. A sealing tab is provided extending from one transverse end of the central section and separated therefrom by a sealing tab fold line. A die cut is cut transversely through that portion of the central section between the transverse fold line(s) and the sealing tab to define the mouth of the pocket for containing a thermometer as described above.

Accordingly, the envelope of the above-described package may be assembled from this one piece blank by folding the side sections and the sealing tab to overlie the central section and sealing them in place with suitable adhesive means.

The invention may be more clearly understood by reference to the appended drawings which are described in detail below.

BRIEF DESCRIPTION OF THE DRAWINGS

FIG. 1 is a perspective view of a packaged thermometer and sheath system incorporating the embodiments of this invention and shown in an open unfolded position;

FIG. 2 is a side view of the packaged system shown in the closed, foled position;

FIG. 3 is a cross-sectional view of FIG. 1 taken through line 3—3;

FIG. 4 is a cross-sectional view of FIG. 2 taken through line 4—4; and

FIG. 5 is a plan view of a one-piece blank from which the packaging of FIG. 1 may be assembled.

DETAILED DESCRIPTION OF THE SPECIFIC EMBODIMENTS

Referring now to FIGS. 1–4 of the drawings, shown therein is the packaged thermometer system 10 of this invention in both the open, unfolded and the closed, folded positions. The package comprises an elongated envelope 12 having an open transverse end 14 and a closed transverse end 16. The envelope has a first major surface 18 (not visible in FIG. 1) and a second major surface 20 shown facing upward in FIG. 1. Approximately midway between the transverse ends 14 and 16 are fold lines 22 and 24 which divide surface 20 into a portion 26 nearest the closed end 16 and a portion 28 nearest the open end 14. By rotating either of these portions about the fold lines, the envelope may be folded so that major surface 20 forms the interior of the folded envelope and major surface 18 forms the exterior. It should be understood that while two fold lines are provided, it is possible to provide only a single line. Two are preferable, however, as they provided a space between portion 26 and 28 when the envelope is folded, to neatly accommodate the packaged thermometer system. The portion 26 is provided with a die cut 30, cut through the surface and extending generally transverse to the longitudinal direction of the envelope. The die cut 30 thus provides a pocket 31 for accomodating the thermometer 32, the mouth of the pocket being defined by the die cut 30 and the bottom of the pocket being closed to retain the thermometer, the closed bottom correspoonding to the closed end 16.

The essential feature of the die cut 30 is that it provides access to the interior of the envelope and thereby forms the mouth of a pocket for holding the thermometer. The die cut 30 should therefore be located at a distance from the closed end 16 sufficient for the pocket to contain the major portion of the thermometer. Preferably, this distance is not greater than the length of the thermometer and still more preferably, the distance is such that a portion of the thermometer will extend out of the pocket and so may be gripped by the fingers to facilitate removal of the thermometer from the pocket. While the die cut 30 may be in any pattern which will provide access to the interior of the envelope, it is preferred that the die cut be in a pattern such that two tabs are formed at the mouth of the pocket. Such a pattern is illustrated in the drawings, wherein the tabs 36 and 36' are defined by the die cut 30. As shown therein, the tabs are printed or otherwise provided with indicia, each indicating respectively, rectal or oral use. The base of each tab, where it joins the remainder of the pocket, is provided with a perforated score 38. In use, once the mode of temperature taking is established, the inappropriate tab may be removed by severing along the perforated score and the remaining tab will indicate such established mode of temperature taking and avoid errors.

The part of portion 26 corresponding to pocket 31 is further provided with fold lines 34, 34' and 34'' to allow the pocket to stand away from the remaining part of portion 26 and thereby facilitate insertion and removal of the thermometer.

When the envelope 12 is in the unfolded position as shown in FIGS. 1 and 3, portion 28 presents a flat surface to which a plurality of thermometer sheaths 42 may be affixed in a manner whereby they can be removed, one at a time, for use. As shown in the drawings, the sheaths may be affixed to the envelope simply by employing staple 44, although it will be clear to one skilled in the art that many alternative means for so affixing the sheaths may also be used, e.g., the sheaths may be bound together in a pad and glued to the portion 28.

Extending from the closed end 16 of the envelope is a closing tab 40. As shown in FIGS. 2 and 4, the closing tab 40 cooperates with the open end 14 of the envelope to maintain the folded envelope in the folded position.

It can be seen from the drawings and the above description that a simple package has been provided for protecting and enclosing both the thermometer and the sheaths from dirt and damage while allowing both to be readily accessible for use.

In a more specific embodiment of this invention, a one-piece blank is provided for assembling the package illustrated in FIGS. 1–4. Referring now to FIG. 5, such a one-piece blank 50 is illustrated. The blank comprises a generally rectangular sheet of planar packaging material, e.g., paperboard, which is divided by longitudinally extending, parallel, fold lines 52 and 54 into two side sections 56 and 58 and a central section 60. The central section 60 has, integral therewith and extending from one transverse end thereof, a sealing tab 62 which is separated from the central section 60 by a fold line 64.

The envelope 12 of FIGS. 1 to 4 may be assembled from the blank 50 by first folding side section 58 along fold line 54 and toward section 60. Sealing tab 62 is then folded along fold line 64 toward the central section 60 to form the closed end 16 of the preceding figures. Glue or other adhesive means may be applied to the upward facing surface of the folded side section 58 and then the other side section 56 is folded along line 52 to overlie and adhere to the folded section 58. In this manner, the envelope 12 of FIGS. 1–4 results having the closed transverse end 16 defined by the ends 66, 64 and 68 of sections 56, 60 and 48, respectively, and the sealing tab 62. The open transverse end 14 is defined by the ends 70, 72 and 74 of sections 56, 60 and 58, respectively.

It should be noted that while section 56 and 58 may be of any relative width provided that they overlap when folded, it is preferable that section 56 be essentially the same width as section 60. Under these circumstances, the exposed seam in the assembled envelope will be positioned at the extreme longitudinal edge of the envelope and, hence, a smooth major surface will be presented.

The blank 50 is provided with the transverse fold lines 22 and 24 which allow the assembled envelope to be folded in the manner described above. It is preferred that section 58 be provided with a cut-out portion or notch 76 in the vicinity of the fold lines 22 and 24. In this way, no glue or other adhesive is used at the position where the assembled envelope is to be folded and, hence, this portion is more flexible and more easily folded.

In accordance with this invention, section 60 is provided with the transverse die cut 30 which defines the mouth of the pocket for containing the thermometer. As described above, the pattern of die cut 30 is such that two tabs 36 and 36' are formed. The tabs are marked (on the side facing downward in FIG. 5) with indicia indicating oral or rectal use. Perforated scores 38 are provided at the base of the tabs. Further, the portion of central section 60 which corresponds to the pocket for holding the thermometer is provided with fold lines 34, 34' and 34'' to allow the pocket in the formed package and to stand away from the remainder of central section 60 and, hence, facilitate insertion and removal of the thermometer.

The side section 56 is provided, at its end 66 with a closing tab 40. As described above, in connection with FIGS. 1–4, the closing tab 40 cooperates with the open end 14 of the folded envelope to maintain the envelope in a folded position.

While the materials for constructing the package of this invention in no way form part of the invention, it is contemplated that generally the package will be made of paperboard material, such paperboard types known as cylinder board, solid bleached sulfate, laminated board or the like. It will be understood by one skilled in the art, however, that paperboard is not the only possible material of construction and so, for example, the package could be constructed of such polymeric materials as polyolefins, polyvinyls and the like. In the case of these latter materials, it is possible to dispense with the one-piece blank and instead to form the envelope by simply extruding or otherwise forming a tube from the polymeric materials and sealing one end thereof by heat, adhesive or other means. It will be understood that the embodiments of the invention described herein are intended to be merely exemplary and those skilled in the art will be able to make additional modifications and variations without departing from the spirit and scope of the appended claims, all such modifications and variations being contemplated as falling within the scope of the claims.

What is claimed is:

1. A package for a thermometer and a plurality of disposable sheaths comprising:
   a longitudinally extending envelope having a closed and an open transverse end and first and second major surfaces;
   said envelope being folded about at least one essentially centrally located transverse fold with said first major surface forming the exterior of said folded envelope and said second major surface forming the interior of said folded envelope;
   a die cut, cut generally transversely through that portion of said second major surface having the closed transverse end to define the mouth of a pocket in the interior of the envelope, said pocket having a closed bottom defined by said closed transverse end of said envelope, said thermometer being positioned in said pocket; and
   said remaining portion of said second major surface presenting a planar surface with said plurality of disposable sheaths being offered thereto and within the folded envelope.

2. The package of claim 1 wherein said closed transverse end has a flap extending therefrom engaging the open transverse end of said folded envelope to maintain the envelope in the folded position.

3. The package of claim 1 wherein said die cut defining the mouth of the pocket is cut in a pattern defining two tabs.

4. The package of claim 3 wherein the tabs are provided with indicia for indicating oral and rectal thermometer use, respectively.

5. The package of claim 4 wherein perforations are provided at the base of said tabs.

6. The package of claim 1 wherein the portion of the second major surface defining a wall of the pocket is provided with fold lines causing this portion to stand away from the remaining walls of the envelope and facilitating insertion and removal of the thermometer.

7. The package of claim 1 wherein said package is assembled from a one-piece blank folded to form said package, said blank comprising:
   a generally elongated rectangular planar sheet provided with two longitudinally extending parallel fold lines dividing said sheet into first and second side sections and a central section;
   at least one transverse fold line located centrally and transverse to said sections;
   a sealing tab extending from one transverse end of said central section and separated therefrom by a sealing tab fold line;
   a die cut, cut transversely through that portion of the central section between the transverse fold line and the sealing tab and defining the mouth of said pocket;
   said side sections and said sealing tab being folded to overlie said central section and sealed to form the envelope having said closed and open transverse ends.

8. The package of claim 7 wherein a closing tab is provided extending from the end of said first side section adjacent to the sealing tab of the central section, said closing tab engaging the open transverse end of said folded envelope to maintain the envelope in the folded position.

9. The package of claim 7 wherein two spaced apart, transverse fold lines are located centrally and transverse to said sections providing a space for said thermometer and sheaths.

10. The package of claim 7 wherein said die cut is cut in a pattern defining two tabs.

11. The package of claim 7 wherein said first side section and said central section are essentially equal in transverse width and said second side section is of lesser transverse width.

12. The package of claim 7 wherein said second side section is notched at said transverse fold line to facilitate folding.

* * * * *